(12) United States Patent
Solanki et al.

(10) Patent No.: US 12,504,986 B2
(45) Date of Patent: Dec. 23, 2025

(54) GUEST OS MANAGED POINT IN TIME SNAPSHOTS

(71) Applicant: VMware LLC, Palo Alto, CA (US)

(72) Inventors: Yogender Solanki, Bangalore (IN); Vikas Suryawanshi, Nanded (IN)

(73) Assignee: VMware, Inc., Palo Alto, CA (US)

( * ) Notice: Subject to any disclaimer, the term of this patent is extended or adjusted under 35 U.S.C. 154(b) by 624 days.

(21) Appl. No.: 17/901,891

(22) Filed: Sep. 2, 2022

(65) Prior Publication Data
US 2024/0012670 A1   Jan. 11, 2024

(30) Foreign Application Priority Data

Jul. 8, 2022   (IN) .............................. 202241039360

(51) Int. Cl.
*G06F 9/455* (2018.01)

(52) U.S. Cl.
CPC ...... *G06F 9/45558* (2013.01); *G06F 9/45545* (2013.01); *G06F 2009/45562* (2013.01); *G06F 2009/4557* (2013.01)

(58) Field of Classification Search
CPC ............. G06F 9/45558; G06F 9/45545; G06F 2009/45562; G06F 2009/4557
See application file for complete search history.

(56) References Cited

U.S. PATENT DOCUMENTS

| | | | | |
|---|---|---|---|---|
| 10,235,247 B1 * | 3/2019 | Natanzon | .............. | G06F 16/188 |
| 2013/0054948 A1 * | 2/2013 | Raj | ....................... | G06F 21/575 |
| | | | | 713/2 |
| 2014/0195753 A1 * | 7/2014 | Khatri | .................. | G06F 3/0619 |
| | | | | 711/162 |
| 2014/0297998 A1 * | 10/2014 | Kang | .................. | G06F 9/45558 |
| | | | | 713/1 |
| 2015/0370652 A1 * | 12/2015 | He | ...................... | G06F 11/1471 |
| | | | | 714/19 |
| 2016/0019081 A1 * | 1/2016 | Chandrasekaran | ......................... | |
| | | | | G06F 9/45558 |
| | | | | 718/1 |
| 2016/0162302 A1 * | 6/2016 | Warszawski | ........ | G06F 9/45558 |
| | | | | 713/2 |
| 2022/0291940 A1 * | 9/2022 | Su | ....................... | G06F 11/0793 |
| 2022/0374519 A1 * | 11/2022 | Botelho | .............. | G06F 11/1464 |
| 2023/0385091 A1 * | 11/2023 | Ramaswamy | ...... | G06F 9/45558 |
| 2023/0409360 A1 * | 12/2023 | Mehra | .................. | G06F 9/4552 |
| 2024/0012670 A1 * | 1/2024 | Solanki | .............. | G06F 9/45545 |

\* cited by examiner

*Primary Examiner* — Dong U Kim
(74) *Attorney, Agent, or Firm* — King Intellectual Asset Management

(57) ABSTRACT

Aspects of the disclosure provide solutions for managing point in time (PIT) snapshots by a guest operating system (OS) to provide more rapid start-up time for virtualized component (VC) clones (e.g., virtual machines, VMs) and simplify restoration. Examples include the guest OS determining that the VC has completed a boot process and is in a known good state. The guest OS instructs the hypervisor to store a PIT snapshot of the VC, including a memory state of the VC. Because the snapshot is captured while the VC is executing, it may be used as an instant clone that avoids delays caused by booting the clone. Some examples include the guest OS detecting a restoration point trigger (e.g., a configuration change) and determining that the VC currently has a stable configuration. The guest OS instructs the hypervisor to store a snapshot of the VC to use later as a restoration point.

20 Claims, 8 Drawing Sheets

GUEST OS MANAGED POINT IN TIME SNAPSHOTS

RELATED APPLICATIONS

Benefit is claimed under 35 U.S.C. 119(a)-(d) to Foreign Application Serial No. 202241039360 filed in India entitled "GUEST OS MANAGED POINT IN TIME SNAPSHOTS", on Jul. 8, 2022, by VMware, Inc., which is herein incorporated in its entirety by reference for all purposes.

BACKGROUND

In a virtual environment, in which virtual components (VCs) (e.g., containers and virtual machines (VMs)), system administrators spawn new VCs, often VC clones, to scale capacity with demand. Bringing up a new VM has a cost in terms of computational burden and time for boot-up, which may exceed the cost of bringing up a new container. This renders VMs a less-preferred option in some scenarios. Some solutions for reducing VM boot-up time do exist, but require privileges to access the hypervisor, which should be denied to most users to comport with best security practices. Thus, these solutions are unavailable to normal users when proper security practices are followed.

Additionally, system restore points for VMs are currently performed using the guest operating system (OS), which is the VM's own OS (not the host platform's OS). Unfortunately, traditional restoration solutions, which roll back individual configuration changes (e.g., software installations, patches, and updates) from within the VM may introduce instabilities. For example, a guest OS is updated and then applications running within the VM are also updated. If a need arises to roll back the guest OS update, this may render one or more of the application inoperable. Attempting to track down and resolve newly-introduced incompatibilities caused by the roll back of a single software component may be burdensome.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide solutions for managing point in time (PIT) snapshots by a guest operating system (OS), and include executing, by a computing platform, under control by a hypervisor, a virtualized component (VC) having a guest OS; determining, by the guest OS, that the VC has completed a boot process and is in a known good state; and while the VC is executing in the known good state, instructing, by the guest OS, the hypervisor to store a PIT snapshot of the VC, the PIT snapshot including a memory state of the VC.

Further aspects of the disclosure include executing, by a computing platform, under control by a hypervisor, a VC having a guest OS; detecting, by the guest OS, a restoration point trigger; determining, by the guest OS, that the VC has a stable configuration; and while the VC has a stable configuration, instructing, by the guest OS, the hypervisor to store a PIT snapshot of the VC.

BRIEF DESCRIPTION OF THE DRAWINGS

The present description will be better understood from the following detailed description read in the light of the accompanying drawings, wherein.

DETAILED DESCRIPTION

Figure 1:
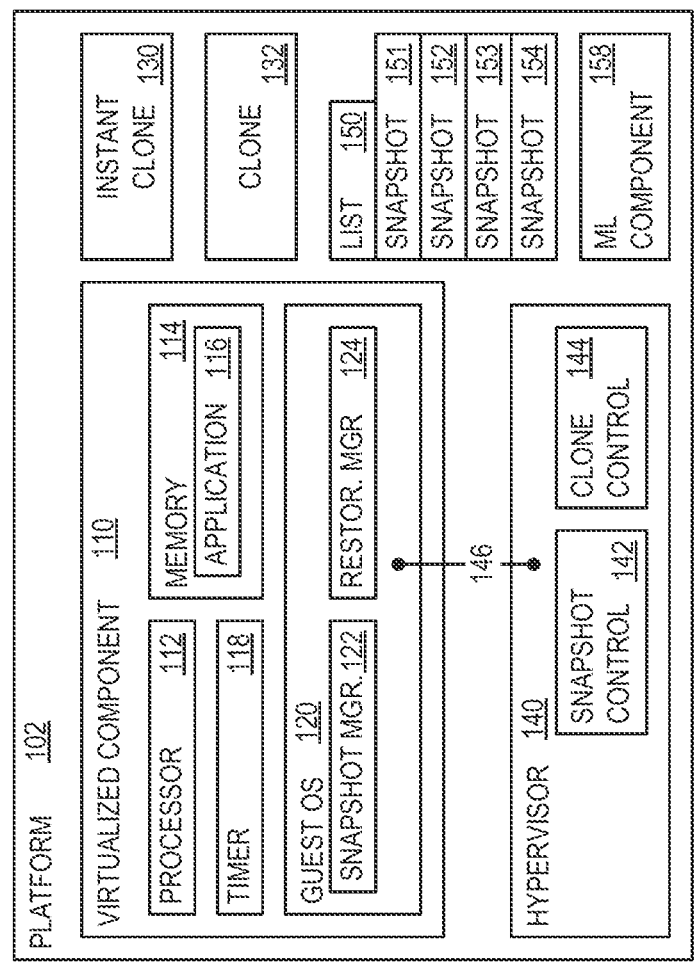
FIG. 1 illustrates an architecture that advantageously provides for guest operating system (OS) managed last known good point in time (PIT) snapshots.

Aspects of the disclosure provide solutions for managing point in time (PIT) snapshots by a guest operating system (OS) to provide more rapid start-up time for virtualized components (VCs), such as virtual machines (VMs), and simplify restoration of VCs. Examples include the guest OS determining that the VC has completed a boot process and is in a known "good" state. The guest OS instructs the hypervisor to store a PIT snapshot of the VC, including a memory state of the VC. Because the snapshot is captured while the VC is executing, it may be used as an instant clone that avoids delays caused by booting a clone. Some examples include the guest OS detecting a restoration point trigger (e.g., a configuration change) and determining that the VC currently has a stable configuration. The guest OS instructs the hypervisor to store a snapshot of the VC to use later as a restoration point.

Aspects of the disclosure reduce computing resources used when spawning VC clones at least by, while the VC is executing in the known good state, instructing, by the guest OS, the hypervisor to store a PIT snapshot of the VC that includes a memory state of the VC. The PIT snapshot may then be executed as an instant clone of the VC that bypasses a boot process to speed up execution and lower computational burden on the computing platform host, thereby reducing computing resources used when spawning VC clones. Additionally, this lower computational burden on the computing platform host reduces power consumption of the computing platform host.

Further aspects of the disclosure improve the reliability of computing operations, for example by, while the VC has a stable configuration, instructing, by the guest OS, the hypervisor to store a PIT snapshot of the VC. The PIT snapshot may then be used for restoration as the restored VC. This precludes uncertainties and risks presented by piecemeal roll-backs within the VC. Thus, aspects of the disclosure provide a practical, useful result to solve a technical problem in the domain of virtualized computing.

While aspects of the disclosure are described with example references to a known good state, those references are merely representative examples of when a VC has determined that a PIT snapshot is desired. These example references are not intended to be limiting. For example, a state that is known to a VC to be good may be described as any condition, criteria, state, or the like that the VC deems as ready or suitable for a PIT snapshot. Examples of such state include, but are not limited to the following: having a stable configuration, ready to immediately begin executing a new application, a processor of the VC is not loaded above a threshold, a processor of the VC is not currently engaging (e.g., reading to or writing from) swap memory, the VC is finished booting, the VC is not busy. However, other examples are contemplated, and may be defined by a user or administrator of the VC. Further, the VC may decide that it is in condition for a PIT snapshot even when the state is not good. For example, the VC may decide, based on current computing resource statistics of the VC, that its state is deteriorating and a PIT snapshot should be taken before there is further deterioration in the state.

Figure 2:
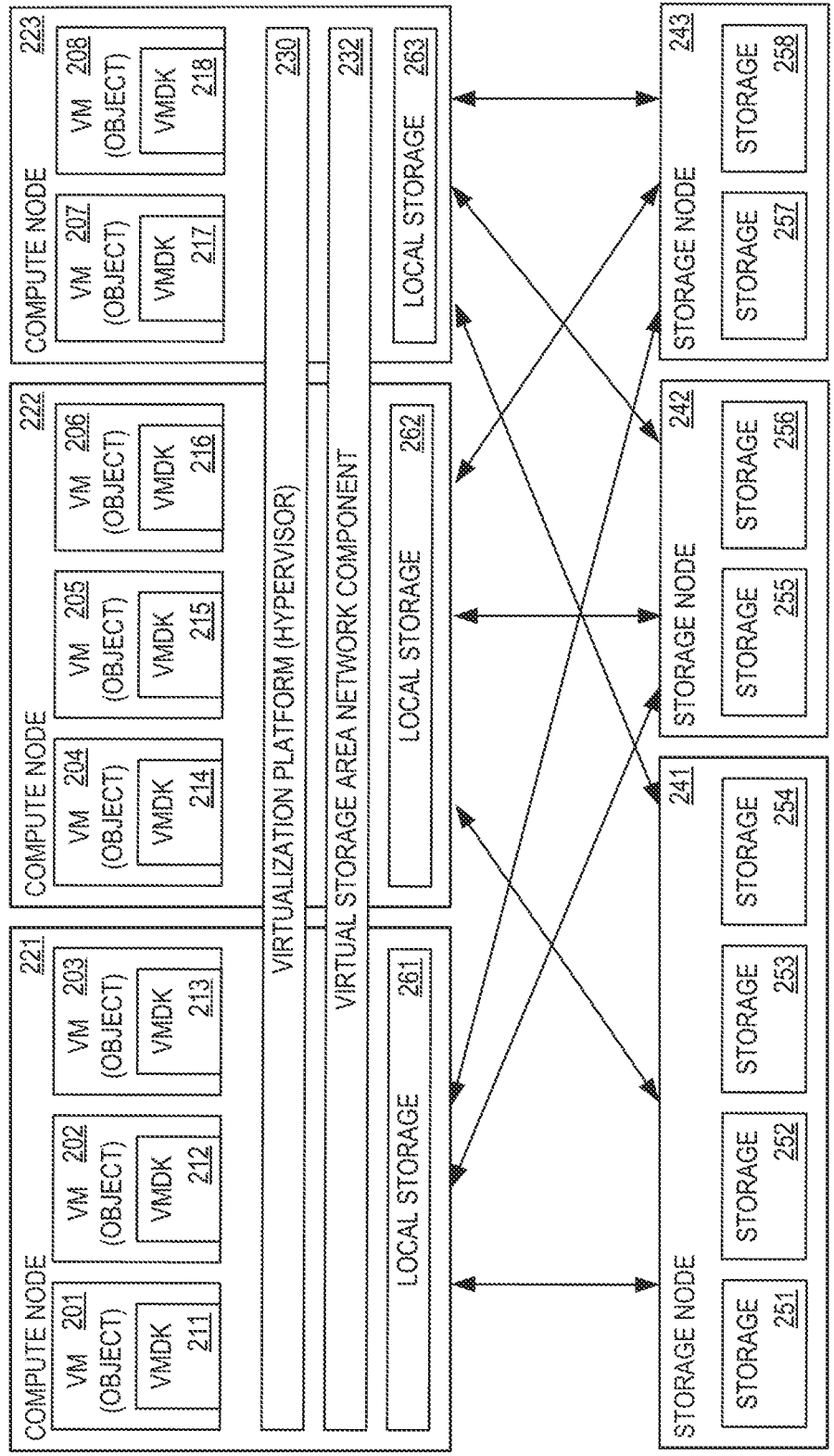
FIG. 2 illustrates further detail for some examples of the architecture of FIG. 1.

FIG. 1 illustrates an architecture 100 that advantageously provides for guest OS managed last good known PIT snapshots on a computing platform 102. In some examples, architecture 100 is implemented using a virtualization architecture, which may be implemented on one or more computing apparatus 818 of FIG. 8, and/or using a virtualization architecture 200, as is illustrated in FIG. 2. An example computing framework on which the components of FIG. 1 may be implemented and executed uses a combination of virtual machines, containers, and serverless computing abstractions.

In the illustrated example, computing platform 102 hosts a VC 110, which may be a VM or a container, and which executes under control by a hypervisor 140 for use by a user 104. An administrator 106, who may have a higher privilege level on computing platform 102 than does user 104, sets up and configures VC 110. For example, the administrator 106 updates, upgrades, or patches VC 110 with update software 108. User employs VC 110 to perform one of any number of computing tasks associated with cloud computing, using an application 116 within a memory 114 of VC 110. Application 116 may be business productivity software or other software useful to user 104, and may be deployed as a container. User 104 may employ multiple ones of VC 110 (e.g., as clones), to employ multiple copies of application 116 simultaneously, or employ different applications on different VCs simultaneously.

As illustrated, VC 110 also has a processor 112 (e.g., virtualized), a timer 118, and a guest OS 120. Guest OS 120 has a snapshot manager 122 and a restoration manager 124, and hypervisor 140 has a snapshot control 142 and a clone control 144. Snapshot manager 122, restoration manager 124, snapshot control 142, and clone control 144 perform operations described herein to manage VC 110 and its clones (e.g., instant clone 130 and a regular clone 132). For example, some of the operations are described below in flowcharts 400, 500, 550, 600, 650, 700, and 750 of FIGS. 4, 5A, 5B, 6A, 6B, 7A, and 7B, respectively. Guest OS 120 and hypervisor 140 communicate with a channel 146 that bridges between guest OS 120 and hypervisor 140. Examples of messages passing through channel 146 are shown in message diagram 300 of FIG. 3. In some examples, channel 146 comprises one or more application programming interfaces (APIs).

For example, hypervisor 140 performs snapshots and saves PIT snapshots 151-154 based at least on instructions received from guest OS 120, and provides a list 150 of available PIT snapshots to guest OS 120. For example, guest OS 120 is permitted to select a restoration point. Additionally, hypervisor 140 leverages PIT snapshots 151 and 152, which are PIT snapshots of VC 110 that include memory 114 of VC 110 when VC 110 is in a known good state and has already completed booting up, to spawn instant clone 130. Because it includes memory 114 of an executing version of VC 110 rather than a version of VC 110 in a non-executing state, instant clone 130 may begin executing more rapidly than clone 132. For example, when clone 132 takes 10 to 20 seconds to begin executing application 116 because clone 132 needs to boot up, instant clone 130 may begin executing application 116 in approximately 1 or 2 seconds. This provides significant time savings for user 104 and reduces power consumption, processing resource consumption, and memory consumption of computing platform 102. In some examples, PIT snapshots 151 and 152 are used to spawn instant clones, and PIT snapshots 153 and 154 are used for restoration (e.g., rollback of VC 110 to a prior version).

A PIT snapshot is a copy of a storage volume, file or database as it appears at a given point in time, and enables a user to select a specific version of VC 110 as it existed at a specific time. Some PIT snapshots store a disk snapshot of a VM, some also store a memory snapshot of an executing VM (e.g., memory 114). Although storing the running memory requires more storage, it permits rapid performance as an instant clone that does not need to perform a boot process. In some examples, keeping PIT snapshots updated uses pointer remapping or copy-on-write (CoW). With pointer remapping, when new copies of a PIT snapshot are made, the more recent copy will maintain a mapping to the original copy. With CoW, when changes are made to data, only the data that is modified will be copied again, rather than make another full copy of the data set.

The PIT snapshots captured in the architecture are knowledge-based snapshots, because the knowledge of guest OS 120 is leveraged to select optimal time(s) for hypervisor 140 to perform the PIT snapshots. For example, guest OS has restore functionality that detects when changes are about to be made to VC 110 that merit creation of a backup restoration point. In some examples, backups may be made on a schedule (e.g., using timer 118) and guest OS 120 knows to delay the start of a scheduled backup if VC 110 is not ready (e.g., VC 110 is in the middle of installing new software or is otherwise busy). In some examples, hypervisor 140 does not have the insight into the state of VC 110 to the same extent as guest OS 120, and guest OS 120 is unable to perform the PIT snapshots. Thus, channel 146 enables the use of the capabilities of hypervisor 140 with the knowledge of guest OS 120.

A machine learning (ML) component 158 may be used to fine-tune parameters of VC 110, and recognition of when VC 110 is in a stable configuration or a known good state. As used herein, ML encompasses artificial intelligence (AI). The findings of ML component 158 may be provided to guest OS 120 as criteria for determining whether VC 110 is in a state suitable for a PIT snapshot, such as a known good state and/or a stable configuration. In some examples, only a fixed number of PIT snapshots are retained (e.g., a set number suitable for use as instant clones, and a set number suitable for use in restoration), and ML component 158 may be used to optimize the number. For example, ML component 158 adjusts the number of retained PIT snapshots.

Use cases for architecture 100 include scenarios in which a large number of containers are employed in a scalable service, and scenarios in which snapshots of a VM may be preferable to application-specific backups. For example, application 116 may be a database query engine, and VC may host a large database. In such scenarios, regular timed backups are common. It may be faster to create a PIT snapshot of the entirety of VC 110 using hypervisor 140 than for VC 110 to perform its own backup of a database.

Examples of architecture 100 are operable with virtualized and non-virtualized storage solutions. FIG. 2 illustrates a virtualization architecture 200 that may be used as a version of computing platform 102. Virtualization architecture 200 is comprised of a set of compute nodes 221-223, interconnected with each other and a set of storage nodes 241-243 according to an embodiment. In other examples, a different number of compute nodes and storage nodes may be used. Each compute node hosts multiple objects, which may be virtual machines (VMs, such as base objects, linked clones, and independent clones), containers, applications, or any compute entity (e.g., computing instance or virtualized computing instance) that consumes storage. When objects are created, they may be designated as global or local, and the designation is stored in an attribute. For example, compute node 221 hosts objects 201, 202, and 203; compute node 222 hosts objects 204, 205, and 206; and compute node 223 hosts objects 207 and 208. Some of objects 201-208 may be local objects. In some examples, a single compute node may host 50, 100, or a different number of objects. Each object uses a VM disk (VMDK), for example VMDKs 211-218 for each of objects 201-208, respectively. Other implementations using different formats are also possible. A virtualization platform 230, which includes hypervisor functionality at one or more of compute nodes 221, 222, and 223, manages objects 201-208. In some examples, various components of virtualization architecture 200, for example compute nodes 221, 222, and 223, and storage nodes 241, 242, and 243 are implemented using one or more computing apparatus such as computing apparatus 818 of FIG. 8.

Virtualization software that provides software-defined storage (SDS), by pooling storage nodes across a cluster, creates a distributed, shared data store, for example a storage area network (SAN). Thus, objects 201-208 may be virtual SAN (vSAN) objects. In some distributed arrangements, servers are distinguished as compute nodes (e.g., compute nodes 221, 222, and 223) and storage nodes (e.g., storage nodes 241, 242, and 243). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. Storage nodes 241-243 each include multiple physical storage components, which may include flash, SSD, NVMe, PMEM, and QLC storage solutions. For example, storage node 241 has storage 251, 252, 252, and 254; storage node 242 has storage 255 and 256; and storage node 243 has storage 257 and 258. In some examples, a single storage node may include a different number of physical storage components.

In the described examples, storage nodes 241-243 are treated as a SAN with a single global object, enabling any of objects 201-208 to write to and read from any of storage 251-258 using a virtual SAN component 232. Virtual SAN component 232 executes in compute nodes 221-223. Using the disclosure, compute nodes 221-223 are able to operate with a wide range of storage options. In some examples, compute nodes 221-223 each include a manifestation of virtualization platform 230 and virtual SAN component 232. Virtualization platform 230 manages the generating, operations, and clean-up of objects 201 and 202. Virtual SAN component 232 permits objects 201 and 202 to write incoming data from object 201 and incoming data from object 202 to storage nodes 241, 242, and/or 243, in part, by virtualizing the physical storage components of the storage nodes.

Figure 3:
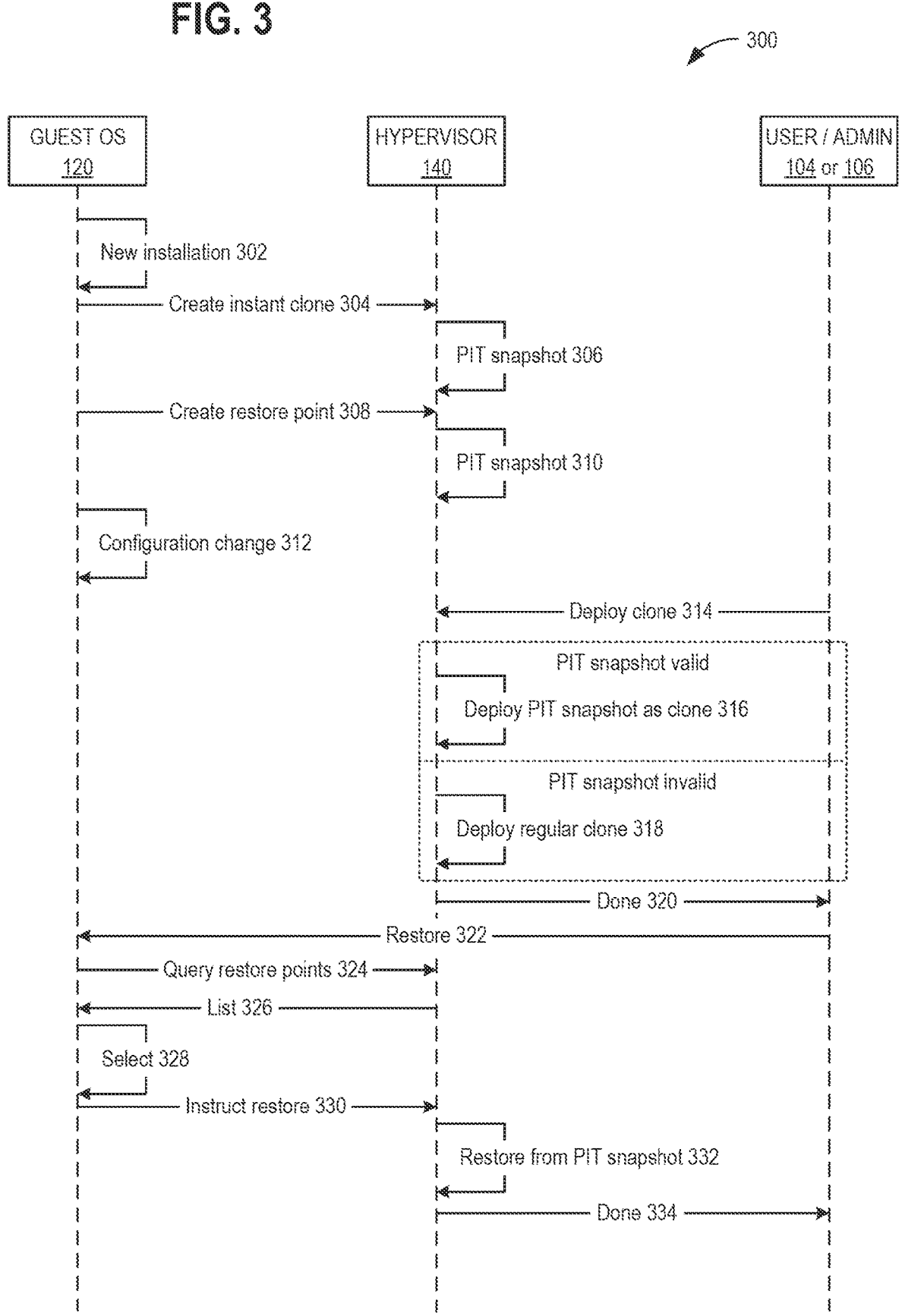
FIG. 3 illustrates a message diagram of messaging that may occur with examples of the architecture of FIG. 1.

FIG. 3 illustrates a message diagram 300 of messaging that may occur with examples of architecture 100. Messages illustrated as passing between guest OS 120 and hypervisor 140 pass through channel 146. Further details on the messages of message diagram 300 are provided in relation to flowcharts 400, 500, 550, 600, and 650, and the example operations of those flowcharts are identified.

Message 302 represents the new installation (e.g., setup and configuration) of VC 110, as described in operation 402 of flowchart 400. Guest OS 120 instructs hypervisor 140 to create a PIT snapshot for an instant clone using message 304 (operation 508 of flowchart 500). Creating a PIT snapshot for an instant clone involves storing the active memory of a running VC in the snapshot. Hypervisor 140 creates a PIT snapshot (e.g., PIT snapshot 151) as shown as message 306 (operation 510 of flowchart 500).

Based on a trigger condition (e.g., user input or detecting the pending installation of software 108), guest OS 120 instructs hypervisor 140 to create a PIT snapshot for a backup (e.g., restore point) using message 308 (operation 608 of flowchart 600). Creating a PIT snapshot for a restore point does not require storing the active memory of a running VC in the snapshot. Hypervisor 140 creates a PIT snapshot (e.g., PIT snapshot 153) as shown as message 310 (operation 610 of flowchart 600). Message 312 represents the installation of software 108 (e.g., new software, software update, patch, or the like).

Message 314 represents a request from user 104, administrator 106 (or another source) to deploy a clone of VC 110 (operation 414 of flowchart 400). Message 316 represents the deployment of instant clone 130, in the scenario that PIT snapshot 151 is valid to use to spawn instant clone 130 (operation 554 of flowchart 550). Message 318 represents the deployment of clone 132, in the alternative scenario that PIT snapshot 151 is not valid to use to spawn instant clone 130 (operation 558 of flowchart 550). Message 320 is the report that the deployment is complete (operation 564 of flowchart 550).

Message 322 represents a request from user 104, administrator 106 (or another source) to restore VC 110 to a prior version (operation 408 of flowchart 400). In some examples, guest OS 120 queries hypervisor 140 for available PIT snapshots to use as restoration options, with message 324 (operation 652 of flowchart 650). Hypervisor 140 provides list 150 of available PIT snapshots to use as restoration points to guest OS 120 in message 326 (operation 654 of flowchart 650). In some examples, guest OS 120 selects an available PIT snapshot from list 150 to use as a restoration point, possibly based on input received from user 104 or administrator 106. For example, user 104 may specify an earlier restoration point than the latest one available. The selection is represented as message 328 (operation 656 of flowchart 650).

Guest OS 120 instructs hypervisor 140 to perform the restoration (e.g., using a designated PIT snapshot) in message 330 (operation 658 of flowchart 650). Hypervisor 140 performs the restoration, which is represented as message 332 (operation 660 of flowchart 650) and reports completion with message 334 (operation 662 of flowchart 650).

Figure 4:
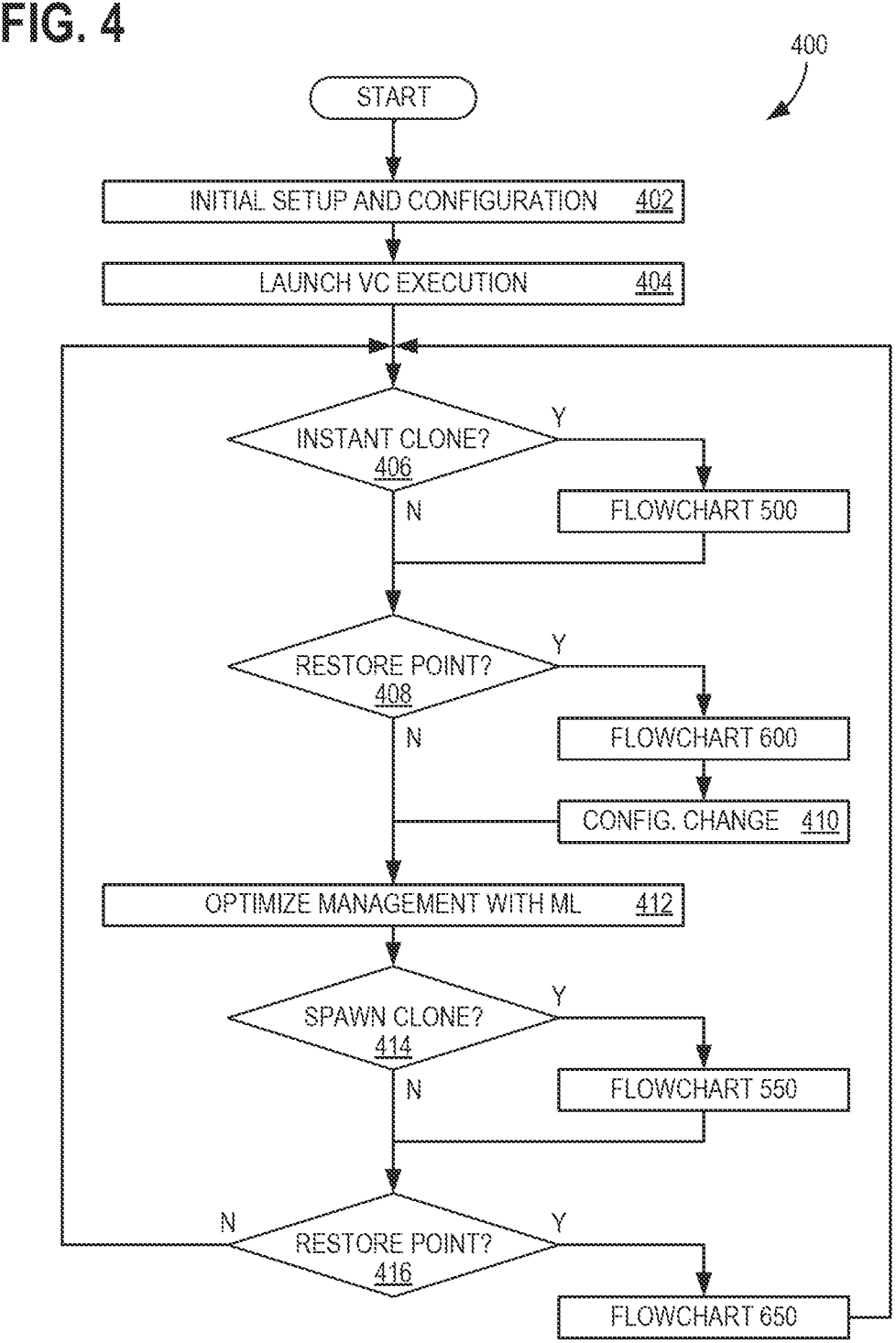
FIG. 4 illustrates a flowchart of exemplary operations associated with examples of the architecture of FIG. 1.

FIG. 4 illustrates a flowchart 400 of exemplary operations associated with architecture 100. In some examples, the operations of flowchart 400 are performed by one or more computing apparatus 818 of FIG. 8. Flowchart 400 commences with operation 402, with the initial setup and configuration of VC 110 (e.g., by administrator 106). In some examples, VC 110 is a "golden VM", which is used as a base object for multiple clones in order to satisfy computing demands by user 104. Computing platform 102 launches VC 110 under control by hypervisor 140 in operation 404. VC 110 has guest OS 120, and in some examples, comprises a VM.

Decision operation 406 determines whether there has been a trigger for creating a PIT snapshot for an instant clone. If so, guest OS 120 detects an instant clone creation trigger (e.g., input from user 104 or administrator 106, or some other process) in decision operation 406. Flowchart 400 then moves to flowchart 500 and returns.

Decision operation 408 determines whether there has been a trigger for creating a PIT snapshot for a restoration point. If so, guest OS 120 detects a restoration point trigger in decision operation 406, and flowchart 400 moves to flowchart 600 and returns. In some example, the restoration point trigger comprises a timer event (e.g., lapse of timer 118), a pending configuration change (e.g., administrator 106 begins installing software 108), a user request (e.g., from user 104 or administrator 106), or an I/O event. The configuration change of VC 110 (e.g., installation of software 108) is performed in operation 410, preferably prior to any need to perform a restoration of VC 110.

In operation 412, ML component 158 observes the execution of VC 110 and the PIT snapshot collection conditions, and later operations that spawn instant clone 130 and perform restoration of VC 110. This includes taking statistics of the already-running VCs as input to an ML algorithm (e.g., applying an ML model to the input) to optimize management of the VCs. Optimizing management includes, for example, adjusting parameters of VC 110 and/or criteria used to determine whether VC 110 is in a known good state or stable configuration.

Decision operation 414 determines whether there has been a request to spawn a clone of VC 110. If so, hypervisor 140 receives the request to deploy (e.g., spawn) a clone of VC 110 in decision operation 414, and flowchart 400 moves to flowchart 550 and returns.

Decision operation 416 determines whether there has been a request to restore VC 110, which may occur if user 104 notices that VC 110 is not operating properly. If so, guest OS 120 receives the request to perform a restoration of VC 110 in decision operation 416, and flowchart 400 moves to flowchart 650 and returns. In some examples, the request to perform a restoration of VC 110 comprises a request to perform a restoration of VC 110 to an earlier configuration. In some examples, the request is received from a user account associated with user 104 that lacks privilege to request a restoration by hypervisor 140 (e.g., user 104 has lower privileges than administrator 106 and cannot access hypervisor).

Flowchart 400 returns to decision operation 406 to await a trigger to create another PIT snapshot for an instant clone or else a trigger to create another PIT snapshot for a restoration point, in decision operation 408. In some examples, snapshot manager 122 performs at least part of decision operation 406, restoration manager 124 performs at least part of decision operations 408 and 416, and snapshot control 142 performs at least part of decision operation 414.

Figure 5A:
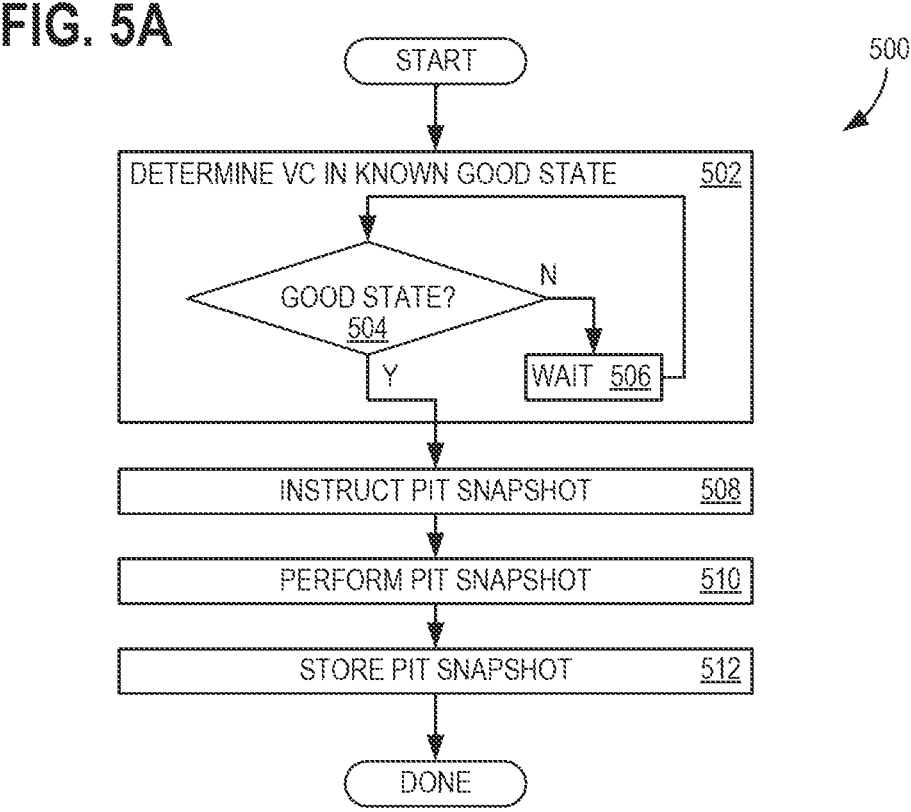
FIGS. 5A and 5B illustrate additional flowcharts of exemplary operations associated with examples of the architecture of FIG. 1.
Figure 5B:
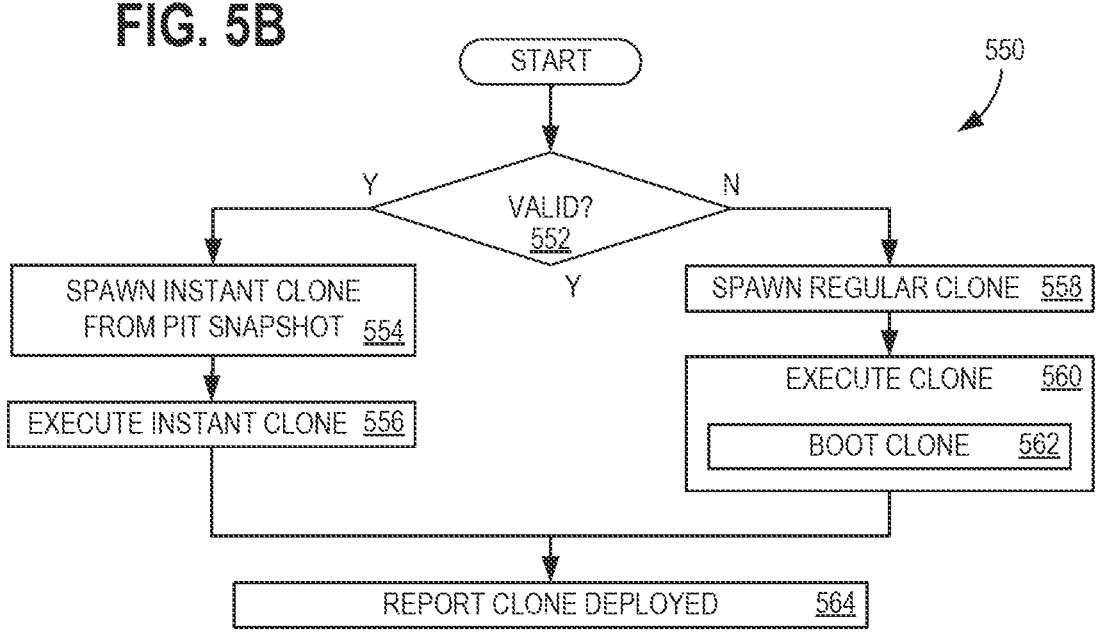

FIGS. 5A and 5B illustrate flowcharts 500 and 550, respectively, of exemplary operations associated with storing and using a PIT snapshot (e.g., PIT snapshot 151) for use as instant clone 130. In some examples, the operations of flowcharts 500 and 550 are performed by one or more computing apparatus 818 of FIG. 8. Flowchart 500 (FIG. 5A) commences with operation 502, which includes determining, by guest OS 120, that VC 110 has completed a boot process and is in a known good state.

In some examples, determining that VC 110 is in a known good state comprises determining that VC 110 has a stable configuration. In some examples, determining that VC 110 is in a known good state comprises determining that VC 110 is ready to immediately begin executing a new application (e.g., application 116). In some examples, determining that VC 110 is in a known good state comprises determining that a processor of VC 110 is not loaded above a threshold, such as an idle threshold that is typically set to 10% (ten percent). In some examples, determining that VC 110 is in a known good state comprises determining that a processor of VC 110 is not currently engaging (e.g., reading to or writing from) swap memory, which is a busy state of VC 110. Essentially, the state desired for the PIT snapshot of VC 110 is one in which VC 110 is finished booting, not busy, and ready to instantly begin performing for user 104. This is generally referred to herein as a state that is known to the VC 100 to be "good" for a PIT snapshot.

Operation 502 includes decision operation 504, that determines whether VC 110 has completed a boot process and is in a known good state, and a wait operation 506 (e.g., a short period of time on timer 118) if VC 110 has not completed the boot process or is not currently in a known good state. After the brief wait period, decision operation 504 checks again. This repeats until decision operation 504 determines that VC 110 is ready for the PIT snapshot.

While VC 110 is executing in the known good state, guest OS 120 instructs hypervisor 140 to store a PIT snapshot of VC 110 (e.g., PIT snapshot 151), including a memory state of VC 110, in operation 508. In a subsequent pass through operation 508, hypervisor 140 will store PIT snapshot 152. In operation 510, hypervisor 140 performs (e.g., collects, takes) PIT snapshot 151, and hypervisor 140 stores PIT snapshot 151 in operation 512. In some examples, snapshot manager 122 performs at least part of operations 502 and 508, and snapshot control 142 performs at least part of operations 510 and 512.

Flowchart 550 (FIG. 5B) commences with decision operation 552 which determines whether PIT snapshot 151 is valid as an instant clone of VC 110. If so, then based on at least determining that PIT snapshot 151 is valid, hypervisor 140 spawns a copy of PIT snapshot 151 as an instant clone of VC 110 (e.g., instant clone 130) in operation 554. In operation 556 computing platform 102 executes instant clone 130 under control by hypervisor 140. Executing instant clone 130 comprises bypassing a boot process, because VC 110 was running at the time PIT snapshot was created, and includes memory 114 of VC 110 in a running state.

If PIT snapshot 151 is not valid as an instant clone of VC 110, then based on at least determining that PIT snapshot 151 is not valid, hypervisor 140 spawns a different clone of VC 110 (e.g., clone 132) in operation 558. In operation 560 computing platform 102 executes clone 132 under control by hypervisor 140. In some examples, executing clone 132 comprises performing a boot process by clone 132 in operation 562. Operation 564 reports that the clone is deployed. In some examples, snapshot control 142 performs at least part of decision operation 552, and clone control 144 performs at least part of operations 554 and 558.

Figure 6A:
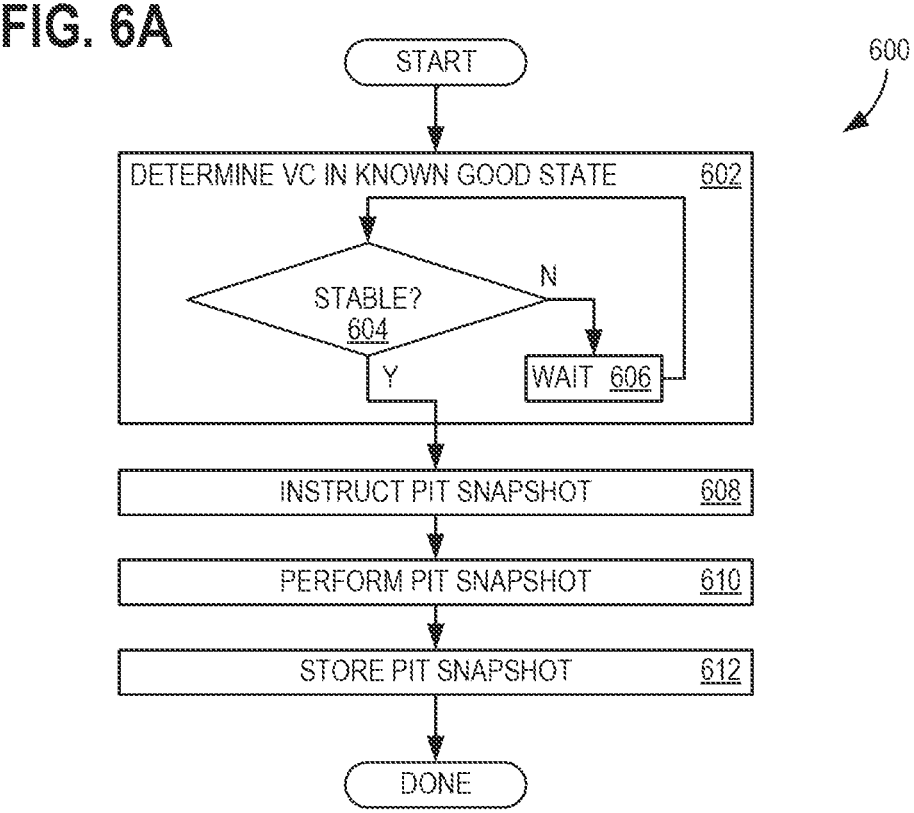
FIGS. 6A and 6B illustrate additional flowcharts of exemplary operations associated with examples of the architecture of FIG. 1.
Figure 6B:
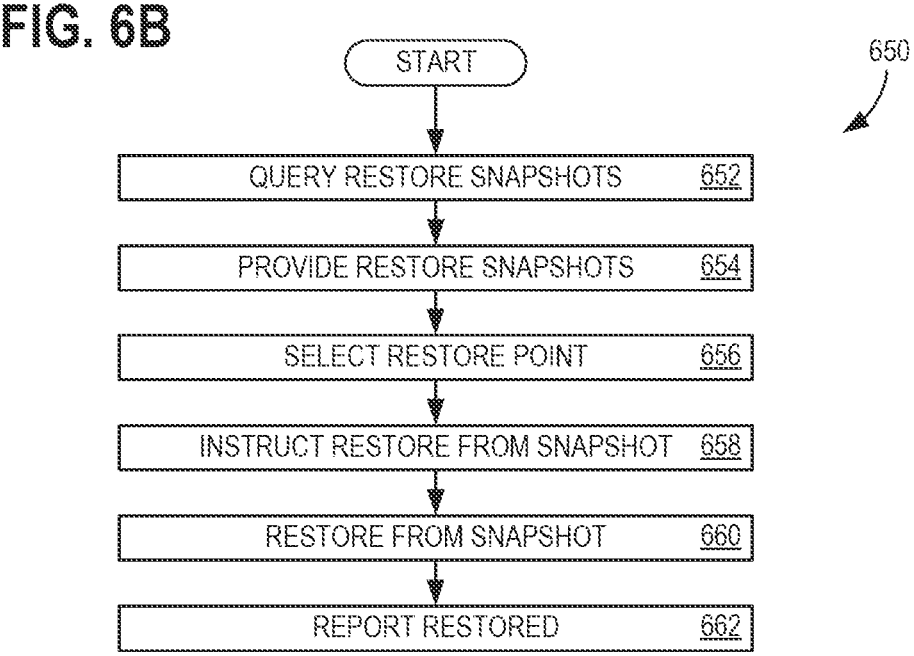

FIGS. 6A and 6B illustrate flowcharts 600 and 650, respectively, of exemplary operations associated with storing and using a PIT snapshot (e.g., PIT snapshot 153) for use as a restoration point for VC 110. In some examples, the operations of flowcharts 600 and 650 are performed by one or more computing apparatus 818 of FIG. 8. Flowchart 600

(FIG. 6A) commences with operation 602, which includes determining, by guest OS 120, that VC 110 has a stable configuration.

In some examples, determining that VC 110 has a stable configuration comprises determining that VC 110 is not currently undergoing a configuration change (e.g., administrator 106 is not part-way through installing software 108). Operation 602 includes decision operation 604, that determines whether VC 110 has a stable configuration, and a wait operation 606 (e.g., a short period of time on timer 118) if VC 110 does not currently have a stable configuration. After the brief wait period, decision operation 604 checks again. This repeats until decision operation 604 determines that VC 110 is ready for the PIT snapshot.

While VC 110 has a stable configuration, guest OS 120 instructs hypervisor 140 to store a PIT snapshot of VC 110 (e.g., PIT snapshot 153), in operation 608. In a subsequent pass through operation 608, hypervisor 140 will store PIT snapshot 154. In operation 610, hypervisor 140 performs (e.g., collects, takes) PIT snapshot 153, and hypervisor 140 stores PIT snapshot 153 in operation 612. In some examples, restoration manager 124 performs at least part of operations 602 and 608, and snapshot control 142 performs at least part of operations 610 and 612.

Flowchart 650 (FIG. 6B) commences with operation 652 in which guest OS 120 queries hypervisor 140 for available PIT snapshots to use for restoration. Hypervisor 140 responds to guest OS 120 in operation 654 by providing list 150 of available PIT snapshots. In operation 656, guest OS 120 selects PIT snapshot 153 for the restoration of VC 110. In some examples, user 104 or administrator 106 is provided with a set of restoration options (e.g., different versions of VC 110, corresponding to PIT snapshots 153 and 154) and is involved with the selection.

In operation 658, guest OS 120 instructs hypervisor 140 to spawn a copy of PIT snapshot 153 as restored VC 110. In operation 660, computing platform 102 executes the restored version of VC 110 under control by hypervisor 140. Operation 662 informs user 104 or administrator 106 that restoration is complete. In some examples, restoration manager 124 performs at least part of operations 652, 656, and 658, and snapshot control 142 performs at least part of operations 654 and 660.

Figure 7A:
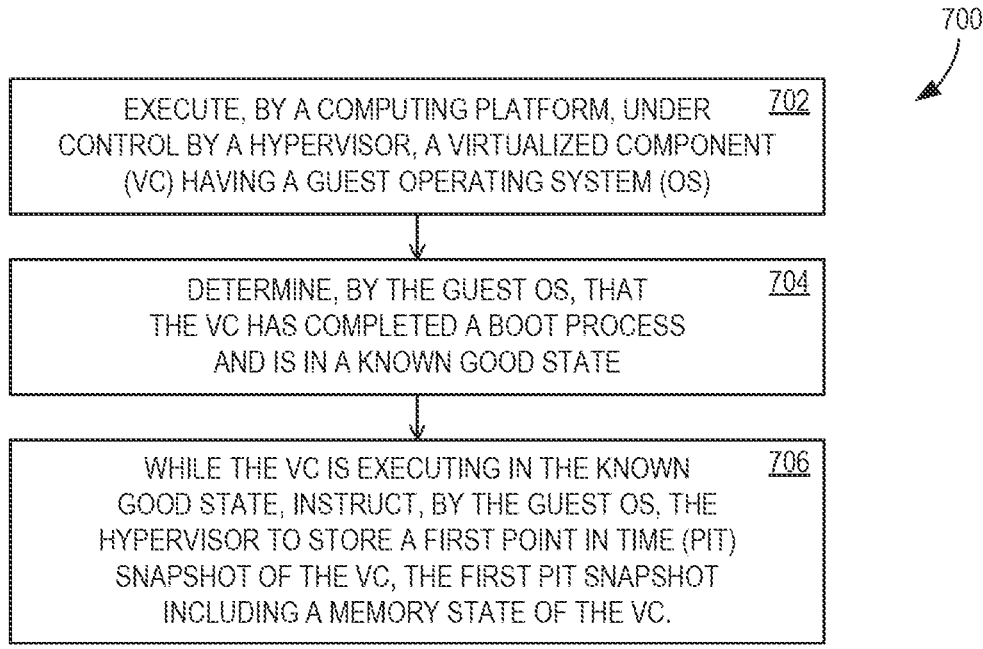
FIGS. 7A and 7B illustrate additional flowcharts of exemplary operations associated with the architecture of FIG. 1.

FIG. 7A illustrates a flowchart 700 of exemplary operations associated with architecture 100. In some examples, the operations of flowchart 700 are performed by one or more computing apparatus 818 of FIG. 8. Flowchart 700 commences with operation 702, which includes executing, by a computing platform, under control by a hypervisor, a VC having a guest operating system OS. Operation 704 includes determining, by the guest OS, that the VC has completed a boot process and is in a known good state. Operation 706 includes, while the VC is executing in the known good state, instructing, by the guest OS, the hypervisor to store a first PIT snapshot of the VC, the first PIT snapshot including a memory state of the VC.

Figure 7B:
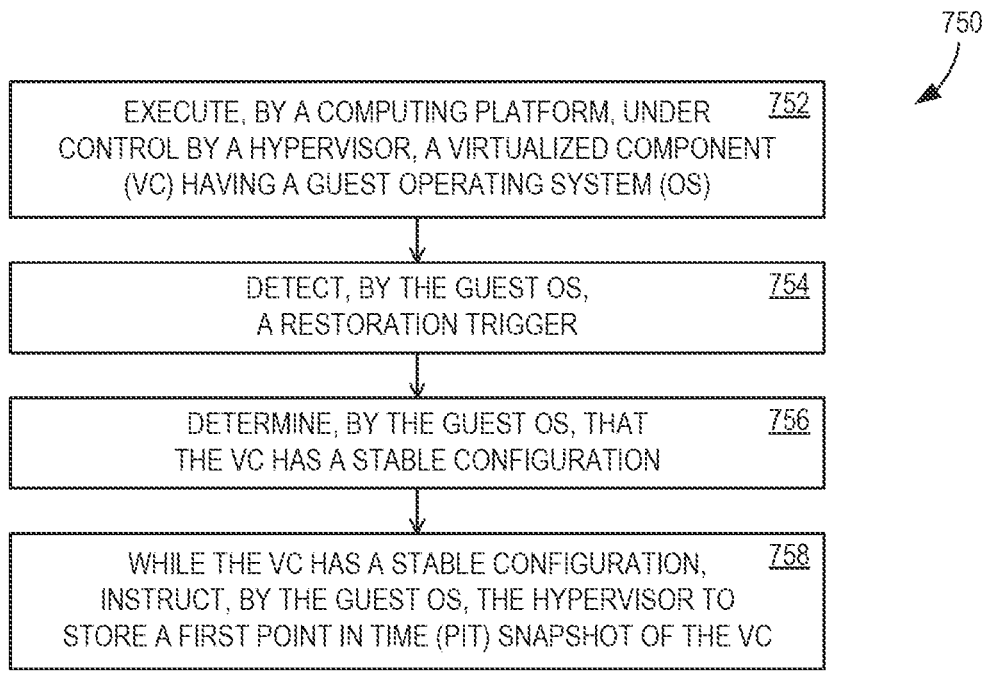

FIG. 7B illustrates a flowchart 750 of exemplary operations associated with architecture 100. In some examples, the operations of flowchart 750 are performed by one or more computing apparatus 818 of FIG. 8. Flowchart 750 commences with operation 752, which includes executing, by a computing platform, under control by a hypervisor, a VC having a guest OS. Operation 754 includes detecting, by the guest OS, a restoration point trigger. Operation 756 includes determining, by the guest OS, that the VC has a stable configuration. Operation 758 includes, while the VC has a stable configuration, instructing, by the guest OS, the hypervisor to store a PIT snapshot of the VC.

ADDITIONAL EXAMPLES

An example method comprises: executing, by a computing platform, under control by a hypervisor, a VC having a guest OS; determining, by the guest OS, that the VC has completed a boot process and is in a known good state; and while the VC is executing in the known good state, instructing, by the guest OS, the hypervisor to store a first PIT snapshot of the VC, the first PIT snapshot including a memory state of the VC.

An example computer system comprises: a processor; and a non-transitory computer readable medium having stored thereon program code executable by the processor, the program code causing the processor to: execute, by a computing platform, under control by a hypervisor, a VC having a guest OS; determine, by the guest OS, that the VC has completed a boot process and is in a known good state; and while the VC is executing in the known good state, instruct, by the guest OS, the hypervisor to store a first PIT snapshot of the VC, the first PIT snapshot including a memory state of the VC.

An example non-transitory computer storage medium has stored thereon program code executable by a processor, the program code embodying a method comprising: executing, by a computing platform, under control by a hypervisor, a VC having a guest OS; determining, by the guest OS, that the VC has completed a boot process and is in a known good state; and while the VC is executing in the known good state, instructing, by the guest OS, the hypervisor to store a first PIT snapshot of the VC, the first PIT snapshot including a memory state of the VC.

Another example method comprises: executing, by a computing platform, under control by a hypervisor, a VC having a guest OS; detecting, by the guest OS, a restoration trigger; determining, by the guest OS, that the VC has a stable configuration; and while the VC has a stable configuration, instructing, by the guest OS, the hypervisor to store a third PIT snapshot of the VC.

Another example computer system comprises: a processor; and a non-transitory computer readable medium having stored thereon program code executable by the processor, the program code causing the processor to perform a method disclosed herein. Another example non-transitory computer storage medium has stored thereon program code executable by a processor, the program code embodying a method disclosed herein.

Alternatively, or in addition to the other examples described herein, examples include any combination of the following:
  the VC comprises a VM;
  storing, by the hypervisor, the first PIT snapshot;
  receiving, by the hypervisor, a request to deploy a VC clone;
  determining whether the first PIT snapshot is valid for an instant clone of the VC;
  based on at least determining that the first PIT snapshot is valid, spawning a copy of the first PIT snapshot as an instant clone of the VC;
  based on at least determining that the first PIT snapshot is valid, executing, by the computing platform, under control by the hypervisor, the instant clone of the VC;
  based on at least determining that the first PIT snapshot is not valid, spawning a copy of a different clone of the VC;

based on at least determining that the first PIT snapshot is not valid, executing, by the computing platform, under control by the hypervisor, the clone of the VC;

detecting, by the guest OS, a restoration point trigger;

determining, by the guest OS, that the VC has a stable configuration;

while the VC has a stable configuration, instructing, by the guest OS, the hypervisor to store a second PIT snapshot of the VC;

storing, by the hypervisor, the second PIT snapshot;

receiving, by the guest OS, a request to perform a restoration of the VC;

instructing, by the guest OS, the hypervisor to spawn a copy of the second PIT snapshot as restored VC;

executing, by the computing platform, under control by the hypervisor, the restored VC;

prior to receiving the request to perform a restoration of the VC, performing a configuration change of the VC;

the request to perform a restoration of the VC comprises a request to perform a restoration of the VC to an earlier configuration;

receiving the request to perform a restoration comprises receiving the request from a user account that lacks privilege to request a restoration by the hypervisor;

providing, by the hypervisor, to the guest OS, a list of available PIT snapshots;

selecting, by the guest OS, the second PIT snapshot for the restoration of the VC;

determining that the VC is in a known good state comprises determining that the VC has a stable configuration;

determining that the VC has a stable configuration comprises determining that the VC is not currently undergoing a configuration change;

determining that the VC is in a known good state comprises determining that the VC is ready to immediately begin executing a new application;

determining that the VC is in a known good state comprises determining that a processor of the VC is not loaded above a threshold;

determining that the VC is in a known good state comprises determining that a processor of the VC is not loaded ten percent;

determining that the VC is in a known good state comprises determining that a processor of the VC is not currently engaging swap memory;

executing the instant clone of the VC comprises bypassing a boot process by the instant clone of the VC;

executing the clone of the VC comprises performing a boot process by the clone of the VC;

the restoration point trigger comprises a timer event;

the restoration point trigger comprises a pending configuration change;

the restoration point trigger comprises a user request;

the restoration point trigger comprises an I/O event;

storing, by the hypervisor, the third PIT snapshot; receiving, by the hypervisor, a request to deploy a VC clone; determining whether the third PIT snapshot is valid for an instant clone of the VC; based on at least determining that the third PIT snapshot is valid: spawning a copy of the third PIT snapshot as an instant clone of the VC; and executing, by the computing platform, under control by the hypervisor, the instant clone of the VC; and based on at least determining that the third PIT snapshot is not valid: spawning a copy of a different clone of the VC; and executing, by the computing platform, under control by the hypervisor, the clone of the VC;

detecting, by the guest OS, a restoration point trigger; determining, by the guest OS, that the VC has a stable configuration; and while the VC has a stable configuration, instructing, by the guest OS, the hypervisor to store a fourth PIT snapshot of the VC;

storing, by the hypervisor, the fourth PIT snapshot; receiving, by the guest OS, a request to perform a restoration of the VC; instructing, by the guest OS, the hypervisor to spawn a copy of the fourth PIT snapshot as restored VC; and executing, by the computing platform, under control by the hypervisor, the restored VC;

prior to receiving the request to perform a restoration of the VC, performing a configuration change of the VC, wherein the request to perform a restoration of the VC comprises a request to perform a restoration of the VC to an earlier configuration, and wherein receiving the request to perform a restoration comprises receiving the request from a user account that lacks privilege to request a restoration by the hypervisor; and providing, by the hypervisor, to the guest OS, a list of available PIT snapshots; and selecting, by the guest OS, the fourth PIT snapshot for the restoration of the VC.

Exemplary Operating Environment

Figure 8:
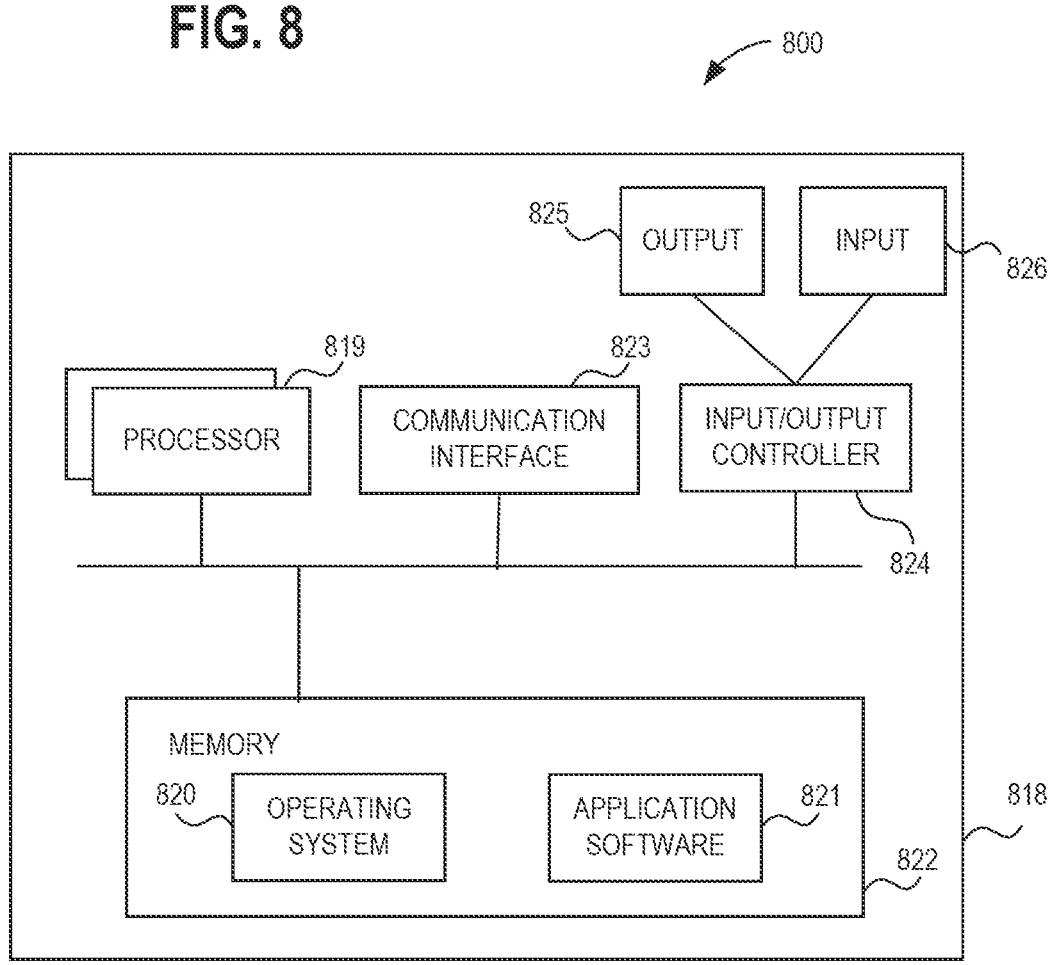
FIG. 8 illustrates a block diagram of a computing apparatus that may be used as a component of the architecture of FIG. 1, according to an example.

The present disclosure is operable with a computing device (computing apparatus) according to an embodiment shown as a functional block diagram 800 in FIG. 8. In an embodiment, components of a computing apparatus 818 may be implemented as part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the computing apparatus 818 to enable application software 821 to be executed on the device. According to an embodiment, the operations described herein may be accomplished by software, hardware, and/or firmware.

Computer executable instructions may be provided using any computer-readable medium (e.g., any non-transitory computer storage medium) or media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, hard disks, RAM, ROM, EPROM, EEPROM, NVMe devices, persistent memory, phase change memory, flash memory or other memory technology, compact disc (CD, CD-ROM), digital versatile disks (DVD) or other optical storage, magnetic cassettes, magnetic tape, magnetic disk storage, shingled disk storage or other magnetic storage devices, or any other non-transmission medium (e., non-transitory) that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g. using a communication interface 823). Computer storage media are tangible, non-transitory, and are mutually exclusive to communication media.

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g. a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method comprising:
executing, by a computing platform, under control by a hypervisor, a virtualized component (VC) having a guest operating system (OS);
determining, by the guest OS, that the VC has completed a boot process and is in a state for a point in time (PIT) snapshot; and
while the VC is executing in the state, instructing, by the guest OS, the hypervisor to obtain and store the PIT snapshot of the VC, the PIT snapshot including a memory state of the VC, wherein an account of the guest OS lacks access to the hypervisor.

2. The computerized method of claim 1, wherein the VC comprises a virtual machine (VM).

3. The computerized method of claim 1, further comprising:
storing, by the hypervisor, the PIT snapshot;
receiving, by the hypervisor, a request to deploy a VC clone;
determining whether the PIT snapshot is valid for an instant clone of the VC,
wherein an instant clone of the VC is a clone of the VC executing in a booted state that is capable of resuming execution without performing the boot process;
based on at least determining that the PIT snapshot is valid:
spawning a copy of the PIT snapshot as an instant clone of the VC; and
executing, by the computing platform, under control by the hypervisor, the instant clone of the VC; and
based on at least determining that the PIT snapshot is not valid:
spawning a copy of a different clone of the VC; and
executing, by the computing platform, under control by the hypervisor, the different clone of the VC.

4. The computerized method of claim 1, further comprising:
detecting, by the guest OS, a restoration point trigger;
determining, by the guest OS, that the is indicated to be in a known good state; and
while the is indicated to be in the known good state, instructing, by the guest OS, the hypervisor to store another PIT snapshot of the VC.

5. The computerized method of claim 4, further comprising:
storing, by the hypervisor, the other PIT snapshot;
receiving, by the guest OS, a request to perform a restoration of the VC;
instructing, by the guest OS, the hypervisor to spawn a copy of the other PIT snapshot as the restored VC; and
executing, by the computing platform, under control by the hypervisor, the restored VC.

6. The computerized method of claim 5, further comprising:
prior to receiving the request to perform a restoration of the VC, performing a configuration change of the VC;
wherein the request to perform a restoration of the VC comprises a request to perform a restoration of the VC to an earlier configuration; and
wherein receiving the request to perform a restoration comprises receiving the request from a user account that lacks privilege to directly request a restoration by the hypervisor.

7. The computerized method of claim 5, further comprising:
providing, by the hypervisor, to the guest OS, a list of available PIT snapshots; and
selecting, by the guest OS, the other PIT snapshot for the restoration of the VC.

8. A computer system comprising:
a processor; and
a non-transitory computer readable medium having stored thereon program code executable by the processor, the program code causing the processor to:
execute, by a computing platform, under control by a hypervisor, a virtualized component (VC) having a guest operating system (OS);
determine, by the guest OS, that the VC has completed a boot process and is in a state for a point in time (PIT) snapshot; and
while the VC is executing in the state, instruct, by the guest OS, the hypervisor to obtain and store a PIT snapshot of the VC, the PIT snapshot including a memory state of the VC, wherein an account of the quest OS lacks access to the hypervisor.

9. The computer system of claim 8, wherein the VC comprises a virtual machine (VM).

10. The computer system of claim 8, wherein the program code is further operative to:
store, by the hypervisor, the PIT snapshot;
receive, by the hypervisor, a request to deploy a VC clone;
determine whether the PIT snapshot is valid for an instant clone of the VC, wherein an instant clone of the VC is a clone of the VC executing in a booted state that is capable of resuming execution without performing the boot process;
based on at least determining that the PIT snapshot is valid:
spawn a copy of the PIT snapshot as an instant clone of the VC; and
execute, by the computing platform, under control by the hypervisor, the instant clone of the VC; and
based on at least determining that the PIT snapshot is not valid:
spawn a copy of a different clone of the VC; and
execute, by the computing platform, under control by the hypervisor, the different clone of the VC.

11. The computer system of claim 8, wherein the program code is further operative to:
detect, by the guest OS, a restoration point trigger;
determine, by the guest OS, that the is indicated to be in a known good state; and
while the is indicated to be in the known good state, instruct, by the guest OS, the hypervisor to store another PIT snapshot of the VC.

12. The computer system of claim 11, wherein the program code is further operative to:
store, by the hypervisor, the other PIT snapshot;
receive, by the guest OS, a request to perform a restoration of the VC;

instruct, by the guest OS, the hypervisor to spawn a copy of the other PIT snapshot as restored VC; and execute, by the computing platform, under control by the hypervisor, the restored VC.

13. The computer system of claim 12, wherein the program code is further operative to:

prior to receiving the request to perform a restoration of the VC, perform a configuration change of the VC;

wherein the request to perform a restoration of the VC comprises a request to perform a restoration of the VC to an earlier configuration; and wherein receiving the request to perform a restoration comprises receiving the request from a user account that lacks privilege to directly request a restoration by the hypervisor.

14. The computer system of claim 12, wherein the program code is further operative to:

provide, by the hypervisor, to the guest OS, a list of available PIT snapshots; and select, by the guest OS, the other PIT snapshot for the restoration of the VC.

15. A non-transitory computer storage medium having stored thereon program code executable by a processor, the program code embodying a method comprising:

executing, by a computing platform, under control by a hypervisor, a virtualized component (VC) having a guest operating system (OS);

determining, by the guest OS, that the VC has completed a boot process and is in a state for a point in time (PIT) snapshot; and while the VC is executing in the state, instructing, by the guest OS, the hypervisor to obtain and store the PIT snapshot of the VC, the PIT snapshot including a memory state of the VC, wherein an account of the quest OS lacks access to the hypervisor.

16. The computer storage medium of claim 15, wherein the VC comprises a virtual machine (VM).

17. The computer storage medium of claim 15, wherein the program code further comprises:

storing, by the hypervisor, the PIT snapshot;

receiving, by the hypervisor, a request to deploy a VC clone;

determining whether the PIT snapshot is valid for an instant clone of the VC, wherein an instant clone of the VC is a clone of the VC executing in a booted state that is capable of resuming execution without performing the boot process;

based on at least determining that the PIT snapshot is valid:

spawning a copy of the PIT snapshot as an instant clone of the VC; and executing, by the computing platform, under control by the hypervisor, the instant clone of the VC; and based on at least determining that the PIT snapshot is not valid:

spawning a copy of a different clone of the VC; and executing, by the computing platform, under control by the hypervisor, the different clone of the VC.

18. The computer storage medium of claim 15, wherein the program code further comprises:

detecting, by the guest OS, a restoration point trigger;

determining, by the guest OS, that the is indicated to be in a known good state; and while the is indicated to be in the known good state, instructing, by the guest OS, the hypervisor to store another PIT snapshot of the VC.

19. The computer storage medium of claim 18, wherein the program code further comprises:

storing, by the hypervisor, the other PIT snapshot;

receiving, by the guest OS, a request to perform a restoration of the VC;

instructing, by the guest OS, the hypervisor to spawn a copy of the other PIT snapshot as restored VC; and executing, by the computing platform, under control by the hypervisor, the restored VC.

20. The computer storage medium of claim 19, wherein the program code further comprises:

prior to receiving the request to perform a restoration of the VC, performing a configuration change of the VC;

wherein the request to perform a restoration of the VC comprises a request to perform a restoration of the VC to an earlier configuration; and wherein receiving the request to perform a restoration comprises receiving the request from a user account that lacks privilege to directly request a restoration by the hypervisor.

* * * * *